March 1, 1966      M. BÖRNER ETAL      3,238,476
ELECTROSTRICTIVE TORSIONAL VIBRATOR Filed May 11, 1961      2 Sheets-Sheet 1

Manfred Börner
Ulrich Weber
Inventors
by: George H. Spencer
Attorney

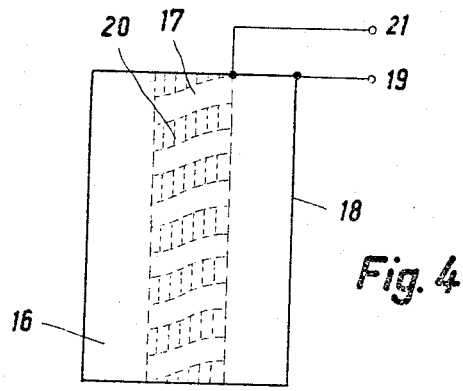
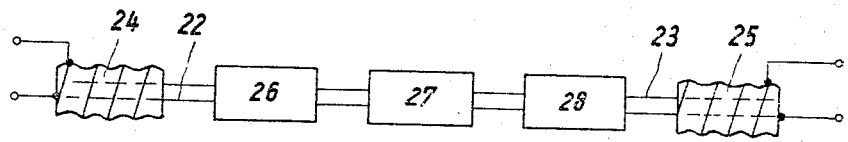
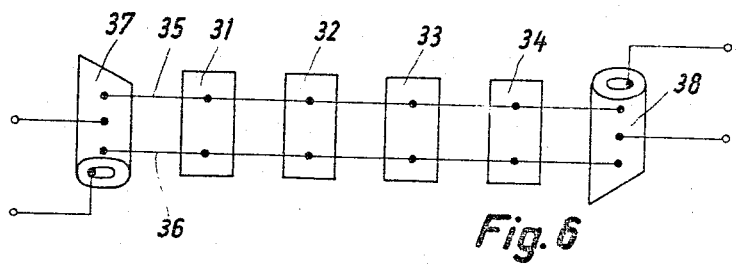
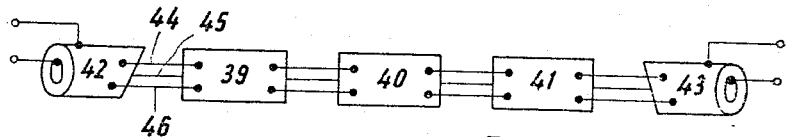

United States Patent Office 3,238,476
Patented Mar. 1, 1966

3,238,476
ELECTROSTRICTIVE TORSIONAL VIBRATOR
Manfred Börner and Ulrich Weber, Ulm (Danube), Germany, assignors to Telefunken Patentverwertungs-G.m.b.H., Ulm (Danube), Germany
Filed May 11, 1961, Ser. No. 109,358
Claims priority, application Germany, May 14, 1960, T 18,375
10 Claims. (Cl. 333—72)

The present invention relates generally to electrostrictive vibrators and, more particularly, to a vibrator in which torsional vibrations occur. This vibrator includes an electrostrictive body of substantially cylindrical shape having coatings on its external cylindrical surface and an internal bore, and being especially adapted for use as a transducer for a mechanical filter.

In the prior art, electrostrictive vibrators having the shape of hollow cylinders are already known. These vibrators are coated and one coating is placed onto the exterior cylindrical surface, and the other onto the wall of the internal bore. Such vibrators are radially pre-polarized and when an alternating voltage is applied to the coatings, they carry out radial thickness vibrations, which cause longitudinal vibrations through transverse contraction. Torsional vibrations do not occur in these bodies.

Furthermore, there is already known an electrostrictive vibrator which also carries out torsional vibrations. This vibrator, also, is in the form of a hollow cylinder but includes two symmetrical halves semi-annular in cross section and separated from one another by coatings. The coatings extend parallel to the axis of the cylinder and lie diametrically opposed to one another. The two halves of the hollow cylinder are pre-polarized inversely and the fields generated by the alternating voltage extend along the circumference of the cylinder. This torsional vibrator is comparatively difficult to manufacture and is not well suited for use as a transducer in mechanical filters because the cylindrical surface is not provided with a coating, i.e., metallized.

For ease in the manufacture of these vibrators, it is desirable that a coating be applied to their exterior cylindrical surfaces since this permits ready connection to the coupling elements by welding them to the coating. Accordingly, it is an object of the present invention to provide an electrostrictive vibrator in which torsional vibrations occur and wherein the vibrator has coatings on its surfaces.

With the above object in view, the vibrators of the present invention are constructed similar to known longitudinal vibrators in that they have a cylindrical shape and concentric inner and outer coatings, but differ therefrom in that the geometric form of the electrostrictive body and/or the shape of one electrode or both electrodes is designed asymmetrically in such a way that, in a mirror image of this body in a plane perpendicular to the axis of torsion, it is not possible by continuously rotating the image around any desired axis and by parallel displacement to make this mirror image coincide with the original body.

Additional objects and advantages of the present invention will become apparent upon consideration of the following description when taken in conjunction with the accompanying drawings in which:

FIGURE 4 is a front elevation of a fourth embodiment of the invention;

FIGURE 5 is a diagrammatic view of a torsion filter using the second embodiment of the invention;

FIGURE 6 is a diagrammatic view of a filter using the first embodiment of the invention; and FIGURE 7 is a diagrammatic view of another torsion filter using the first embodiment.

Figure 1A:
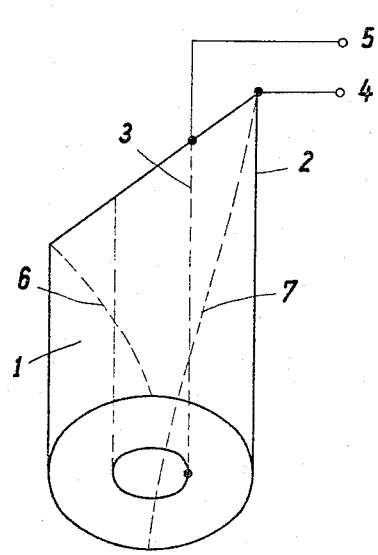
FIGURES 1a and 1b are front and side elevations, respectively, of one embodiment of the present invention.
Figure 1B:
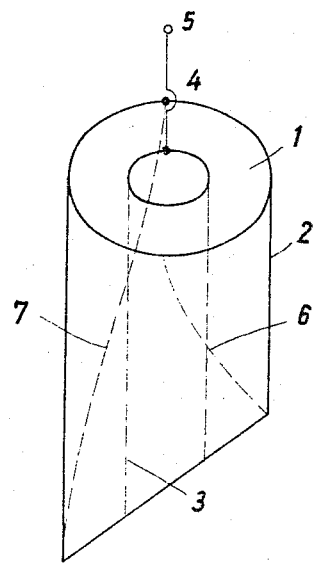

FIGURES 1a and 1b illustrate a first embodiment of a torsional vibrator, wherein the electrostrictive body 1, of barium titanate, for example, is a hollow cylinder. The first coating is applied to the exterior cylindrical surface 2 and the second coating is applied to the internal wall 3. The coatings may be produced by applying a silver paste to the body of electrostrictive material or in some other manner if desired. Electric terminals 4 and 5 are provided. The asymmetry of the electrostrictive body is such that the front or end surfaces of the hollow cylinder extend obliquely to the axis of symmetry and the planes defined by the axis of symmetry and lines at right angles to the end surfaces at their intersections with the axis of symmetry are at least approximately at right angles to one another.

The excitation of this body to torsional vibrations may be explained as follows. As in the known longitudinal vibrators, the pre-polarization extends in radial direction, the field generated by the alternating vibrations extending likewise. As in the case of longitudinal vibrators, this structure carries out radially directed thickness vibrations which, in turn, cause longitudinal vibrations through the transverse contractions. However, because of the oblique nature of the front surfaces the longitudinal vibrations are distorted so as to bring about a torsional vibration, too. Thus, for example, the surface line 6 shown in FIGURE 1b will change less in its length during the vibration than will the surface line 7. Other surface lines carry out longitudinal vibrations whose amplitudes lie between the amplitudes of the two surface lines 6 and 7.

This may be seen to bring about a torsional vibration of the vibrator.

Figure 2:
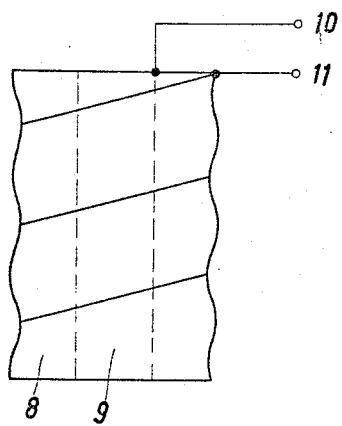
FIGURE 2 is a front elevation of a second embodiment of the invention.

In the embodiment shown in FIGURE 2, also, the shape of the electrostrictive body is chosen so that longitudinal vibrations are changed into torsional vibrations. The electrostrictive body 8 has a cylindrical bore 9 having a coating with a terminal 10 applied to the wall thereof. The curved surface of the electrostrictive body 8 deviates from the pure cylinder form by being designed helically. The entire curved surface is likewise provided with a coating having a terminal 11. In this case, too, the pre-polarization is radial and the alternating field likewise extends substantially radially. The alternating field produces a longitudinal dilatation along the spirals, resulting in a torsional vibration.

Figure 3:
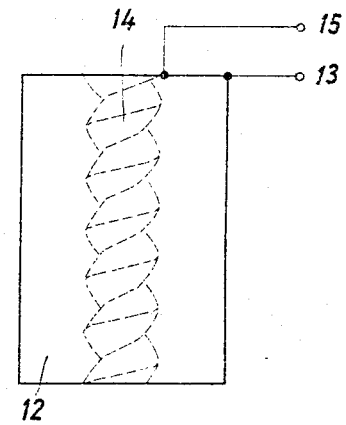
FIGURE 3 is a front elevation of a third embodiment of the invention.

In the embodiment according to FIGURE 3, the conditions are similar to those in the embodiment of FIGURE 2. In this case, the outer surface of the electrostrictive body 12 is cylindrical. This cylindrical surface is provided with a conductive coating having a terminal 13. The bore 14, in this case, is shaped like threads. The walls of the bore 14 are provided with the second coating having a terminal 15. The torsional vibration, in this case, is brought about in a manner similar to the vibration in the case of the vibrator shown in FIGURE 2.

In a vibrator according to the invention shown in FIGURE 4, the torsional vibration is produced by the special shape given to one of the two coatings. The electrostrictive body 16 is perfectly cylindrical. The inner bore 17 lies concentric to the surface 18 of the cylinder. Surface 18 of the cylinder is provided with a conductive coating which is connected through the terminal 19. However, the bore is not provided with a continuous cylindrical conductive coating. Rather, the conductive coating in this case is applied in the form of a spiral 20 having a terminal 21. The torsional vibrations, in this case, come about by the fact that the areas of the electrostrictive body adjacent to the conductive coating 20 carry out stronger thickness vibrations than the other areas, bringing about dilatations along a helical track and thereby torsional vibrations of the body.

In addition to the embodiments shown in FIGURES 1 through 4, other torsionally vibrating structures are possible all within the scope of the invention. It is possible to apply characteristics of the individually shown vibrators jointly in one vibrator. Care has to be taken, however, that the torsional vibrations caused by the shape given to the bodies and electrodes support one another in the same direction and do not counteract each other.

FIGURE 5 illustrates one use of the vibrator of FIGURE 2 as a transducer in a torsion filter wherein both the vibration elements and the coupling elements are axially aligned with their axes of symmetry coinciding. The outer coupling elements 22 and 23, are disposed through the internal bores of the torsional transducers 24, 25, and fastened in the bore by gluing or soldering. Both the transducers 24, 25, and the vibration elements 26, 27, 28, vibrate torsionally.

The filter shown in FIGURE 6 has special advantages. In a manner already proposed, the individual vibration elements 31 to 34 are arranged in such a way that the axes of symmetry run parallel to one another. The coupling between the individual vibration elements is accomplished by at least one longitudinally vibrating coupling line. In the present embodiment, four coupling lines are provided, of which only two, 35 and 36, are visible in the drawing. Preferably, the wires 35 and 36 are connected with the vibration elements 31 to 34 by spot welding. In prior filters of this type longitudinal vibrators were provided as transducers. The present torsional transducers may be arranged in the same direction as the individual vibration elements. Torsional vibrators 37, 38, are used which were described in more detail with reference to FIGURES 1a and 1b. A particular advantage is obtained in using these torsional vibrators in that the double lines may be welded onto the surface coating of the torsional vibrators just as in the case of the vibration elements, thereby considerably simplifying the production.

FIGURE 7 shows a further embodiment of a torsionally vibrating mechanical filter using the torsional vibrators of FIGURE 1. As in the embodiment of FIGURE 5, both the vibration elements 39 to 41 and the torsional vibrators 42 and 43 are axially aligned with their axes of symmetry coinciding. In this embodiment, three coupling lines 44, 45, and 46, are provided as coupling elements which are fastened to the cylindrical surfaces of the torsional vibrators and vibration elements by spot welding.

It should be recognized that while specific means of attaching the coupling lines to the vibrators have been disclosed, any desired method of attaching them may be used. Thus, for example, in the filter of FIGURE 5, they may be connected by spot welding and in the filters of FIGURES 6 and 7, they may be connected by gluing or soldering.

It will be seen from the above that the vibrator of the present invention, in each embodiment, is such formed geometrically or has an electrode so formed geometrically that in a mirror image of the vibrator in a plane at right angles to the axis of torsion it is not possible to make the mirror image coincide with the original body by continuous rotation about any desired axis and by parallel displacement. For example, considering the first embodiment of the invention (FIGURES 1a and 1b), looking down on the vibrator along its axis of torsion, the point on the major axis of the elliptical end face of the upper surface which is furthest from the geometric center of the vibrator (where terminal 4 is located) is displaced 90 degrees clockwise with respect to the corresponding point on the other end surface. If it is assumed that a mirror is disposed above the vibrator at right angles to the axis of torsion and facing the vibrator, then in this image the point where terminal 4 is located is displaced 90 degrees counter-clockwise with respect to the corresponding point on the other end surface. This is so even if the mirror image is rotated about any axis whatsoever.

It will be understood that the above description of the present invention is susceptible to various modifications, changes, and adaptations, and the same are intended to be comprehended within the meaning and range of equivalents of the appended claims.

What is claimed is:

1. An electrostrictive vibrator for use as a transducer for a mechanical filter or the like, comprising, in combination: a substantially cylindrical, radially pre-polarized electrostrictive body; coatings on said body applied to the cylindrical surface and the wall of an internal bore and which coatings serve at the same time for applying the pre-polarization voltage and the alternating driving voltage and thus define electrodes, the geometric form of one electrode being asymmetrical in such a way that, in a mirror image of this body in a plane disposed at right angles to the axis of torsion, such mirror image cannot be made to coincide with the original body by continuous rotation around any axis whatever and by parallel displacement of the mirror image, the coatings being disposed coaxial with respect to one another, and the end surfaces of the cylinder extending obliquely to the axis of symmetry in such a way that the two planes defined by said axis and by lines at right angles to the end surfaces taken at the points where they intersect are at least nearly at right angles to one another.

2. A mechanical filter, comprising, in combination: torsional vibrators; vibration elements disposed coaxial with respect thereto; coupling elements connected between the vibration elements and connecting the latter to the vibrators, each vibrator including a substantially cylindrical, radially pre-polarized electrostrictive body, electrode defining coatings on said body applied to the cylindrical surface and the wall of an internal bore and which coatings serve at the same time for applying the pre-polarization voltage and the alternating driving voltage, the geometric form of one electrode being asymmetrical in such a way that, in a mirror image of this body in a plane disposed at right angles to the axis of torsion, such mirror image cannot be made to coincide with the original body by continuous rotation around any axis whatever and by parallel displacement of the mirror image.

3. A mechanical filter according to claim 1, wherein the outer coupling members are glued to the internal bores of the vibrators.

4. A mechanical filter according to claim 1, wherein the outer coupling members are soldered to the internal bores of the vibrators.

5. A mechanical filter, comprising, in combination: torsional vibrators including a substantially cylindrical, radially pre-polarized electrostrictive body, coatings on said body applied to the cylindrical surface and the wall of an internal bore and which coatings serve at the same time for applying the pre-polarization voltage and the alternating driving voltage, the geometric form of one electrode being asymmetrical in such a way that, in a mirror image of this body in a plane disposed at right angles to the axis of torsion, such mirror image cannot be made to coincide with the original body by continuous rotation around any axis whatever and by parallel displacement of the mirror image; and coupling lines for coupling the vibrators to the other elements of the filter, said coupling lines being fastened to a surface of the vibrator by spot welding.

6. A mechanical filter according to claim 5, wherein the coupling lines are fastened to the cylindrical surfaces of the vibrators.

7. A mechanical filter according to claim 5, wherein the coupling lines are fastened to end surfaces of the vibrators.

8. An electrostrictive vibrator for use as a transducer for a mechanical filter or the like, comprising, in combination: a substantially cylindrical, radially pre-polarized electrostrictive body; coatings on said body applied to the cylindrical surface and the wall of an internal bore and which coatings serve at the same time for applying the pre-polarization voltage and the alternating driving voltage and thus define electrodes, the geometric form of one electrode being asymmetrical in such a way that, in a mirror image of this body in a plane disposed at right angles to the axis of torsion, such mirror image cannot be made to coincide with the original body by continuous rotation around any axis whatever and by parallel displacement of the mirror image, the planes of the end surfaces being so inclined with respect to each other that their line of intersection is skew with respect to the axis of symmetry so that the radial oscillations which are excited are at least in part converted to torsional oscillations.

9. An electrostrictive vibrator for use as a transducer for a mechanical filter or the like, comprising, in combination: a substantially cylindrical, radially pre-polarized electrostrictive body; coatings on said body applied to the cylindrical surface and the wall of an internal bore and which coatings serve at the same time for applying the pre-polarization voltage and the alternating driving voltage and thus define electrodes, the geometric form of one electrode being asymmetrical in such a way that, in a mirror image of this body in a plane disposed at right angles to the axis of torsion, such mirror image cannot be made to coincide with the original body by continuous rotation around any axis whatever and by parallel displacement of the mirror image, the planes of the end surfaces being so inclined with respect to each other that the projection of their line of intersection, into a plane which is at a right angle with the shortest imaginary line between said line of intersection and said axis of symmetry, intersects the projection of the line of symmetry at an angle other than a right angle.

10. A filter as defined in claim 5, wherein the coatings are disposed coaxial with respect to one another, and the end surfaces of the cylinder extend obliquely to the axis of symmetry in such a way that the two planes defined by said axis and by lines at right angles to the end surfaces taken at the points where they intersect are at least nearly at right angles to one another.

References Cited by the Examiner

UNITED STATES PATENTS

| | | | |
|---|---|---|---|
| 2,328,496 | 8/1943 | Rocard | 310—26 |
| 2,762,985 | 9/1956 | George | 310—26 |
| 2,799,832 | 7/1957 | Neederman | 333—72 |
| 2,808,572 | 10/1957 | Ibsen | 310—26 |
| 2,828,470 | 3/1958 | Mason | 310—9.6 |
| 2,830,274 | 4/1958 | Bosen | 333—72 |
| 2,838,695 | 6/1958 | Thurston | 333—72 |
| 2,838,696 | 6/1958 | Thurston | 333—72 |
| 2,876,419 | 3/1959 | Gianola | 310—26 |
| 2,928,069 | 3/1960 | Peterman | 340—10 |
| 2,955,267 | 10/1960 | Mason | 333—71 |
| 2,974,296 | 3/1961 | Rosen | 333—72 |
| 2,994,047 | 7/1961 | Börner | 333—72 |
| 3,015,789 | 1/1962 | Honda | 333—72 |

ELI LIEBERMAN, *Acting Primary Examiner.*

MILTON O. HIRSHFIELD, HERMAN KARL SAALBACH, *Examiners.*